(12) United States Patent
Wang et al.

(10) Patent No.: US 11,627,087 B2
(45) Date of Patent: *Apr. 11, 2023

(54) METHOD AND APPARATUS FOR FLEXIBLE AND EFFICIENT ANALYTICS IN A NETWORK SWITCH

(71) Applicant: Marvell Asia Pte, Ltd., Singapore (SG)

(72) Inventors: Weihuang Wang, Los Gatos, CA (US); Gerald Schmidt, San Jose, CA (US); Tsahi Daniel, Palo Alto, CA (US); Saurabh Shrivastava, Saratoga, CA (US)

(73) Assignee: MARVELL ASIA PTE, LTD, Singapore (SG)

( * ) Notice: Subject to any disclaimer, the term of this patent is extended or adjusted under 35 U.S.C. 154(b) by 206 days.

This patent is subject to a terminal disclaimer.

(21) Appl. No.: 16/875,776

(22) Filed: May 15, 2020

(65) Prior Publication Data
US 2020/0351206 A1 Nov. 5, 2020

Related U.S. Application Data

(62) Division of application No. 14/289,533, filed on May 28, 2014, now Pat. No. 10,680,957.

(51) Int. Cl.
*H04L 47/20* (2022.01)
*H04L 43/0888* (2022.01)
(Continued)

(52) U.S. Cl.
CPC .......... *H04L 47/20* (2013.01); *H04L 12/1407* (2013.01); *H04L 12/1435* (2013.01);
(Continued)

(58) Field of Classification Search
CPC ....... H04L 47/10; H04L 47/20; H04L 47/125; H04L 47/32; H04L 47/50; H04L 47/24;
(Continued)

(56) References Cited

U.S. PATENT DOCUMENTS

| 4,636,967 A | 1/1987 | Bhatt et al. |
| 5,239,641 A | 8/1993 | Horst |

(Continued)

FOREIGN PATENT DOCUMENTS

| CN | 1445780 A | 10/2003 |
| CN | 103259694 A | 8/2013 |
| CN | 103560980 A | 2/2014 |

OTHER PUBLICATIONS

The office action dated Jul. 2, 2019, for Chinese Application No. 2015102577022.

(Continued)

*Primary Examiner* — Farzana B Huq

(57) ABSTRACT

Embodiments of the present invention relate to a centralized network analytic device, the centralized network analytic device efficiently uses on-chip memory to flexibly perform counting, traffic rate monitoring and flow sampling. The device includes a pool of memory that is shared by all cores and packet processing stages of each core. The counting, the monitoring and the sampling are all defined through software allowing for greater flexibility and efficient analytics in the device. In some embodiments, the device is a network switch.

28 Claims, 5 Drawing Sheets

(51) Int. Cl.
*H04L 43/0894* (2022.01)
*H04L 43/0805* (2022.01)
*H04L 12/14* (2006.01)
*H04M 15/00* (2006.01)
*H04L 41/142* (2022.01)
*H04L 41/0893* (2022.01)

(52) U.S. Cl.
CPC ...... *H04L 43/0805* (2013.01); *H04L 43/0888* (2013.01); *H04L 43/0894* (2013.01); *H04L 41/0893* (2013.01); *H04L 41/142* (2013.01); *H04M 15/58* (2013.01)

(58) Field of Classification Search
CPC . H04L 47/245; H04L 47/522; H04L 41/0823; H04L 41/14; H04L 41/147; H04L 45/125; H04L 45/64; H04L 45/60; H04L 45/38; H04L 45/306; H04L 49/90; H04L 49/205; H04L 49/206; H04L 49/25; H04L 49/351; H04L 49/503; H04L 49/9021; H04L 49/9094; H04L 12/1407; H04L 12/1435; H04L 43/0805; H04L 43/0888; H04L 43/0894; H04L 41/0893; H04L 41/142; H04M 15/58
See application file for complete search history.

(56) References Cited

U.S. PATENT DOCUMENTS

| | | | |
|---|---|---|---|
| 5,274,644 A | 12/1993 | Berger et al. | |
| 5,663,948 A | 9/1997 | Kobunaya | |
| 5,809,174 A | 9/1998 | Purcell et al. | |
| 6,711,165 B1 | 3/2004 | Tzeng | |
| 6,741,589 B1 | 5/2004 | Sang | |
| 6,823,150 B1 | 11/2004 | Cao | |
| 6,938,132 B1 | 8/2005 | Joffe et al. | |
| 7,085,229 B1 | 8/2006 | Potter, Jr. et al. | |
| 7,215,637 B1 | 5/2007 | Ferguson | |
| 7,266,606 B2 | 9/2007 | Ganti | |
| 7,269,697 B1* | 9/2007 | Reeve | G06F 13/1642 711/154 |
| 7,280,476 B2 | 10/2007 | Anderson | |
| 7,330,927 B1 | 2/2008 | Reeve | |
| 7,546,480 B1 | 6/2009 | Swenson et al. | |
| 7,627,870 B1 | 12/2009 | Michaeli et al. | |
| 8,077,611 B2 | 12/2011 | Bettink | |
| 8,542,602 B2 | 9/2013 | Nandagopal | |
| 8,671,220 B1 | 3/2014 | Garg | |
| 8,725,873 B1 | 5/2014 | Bromberg | |
| 8,799,624 B1 | 8/2014 | Griffin | |
| 8,831,041 B2 | 9/2014 | Keith | |
| 9,246,823 B1 | 1/2016 | Sukonik | |
| 9,331,929 B1 | 5/2016 | Thomas et al. | |
| 2002/0097677 A1* | 7/2002 | Hoar | H04L 47/32 370/386 |
| 2002/0116587 A1* | 8/2002 | Modelski | G06F 9/3851 712/E9.053 |
| 2003/0093655 A1 | 5/2003 | Gosier | |
| 2006/0045074 A1 | 3/2006 | Lee | |
| 2006/0059315 A1 | 3/2006 | Moll | |
| 2006/0221819 A1 | 10/2006 | Padwekar | |
| 2008/0005780 A1 | 1/2008 | Singleton | |
| 2008/0091884 A1* | 4/2008 | Piry | G06F 12/0831 711/E12.001 |
| 2009/0028045 A1 | 1/2009 | Stellenberg et al. | |
| 2011/0022791 A1 | 1/2011 | Sundar | |
| 2011/0153840 A1 | 6/2011 | Narayana | |
| 2011/0268119 A1 | 11/2011 | Pong | |
| 2011/0292830 A1 | 12/2011 | Yanggratoke | |
| 2012/0063352 A1* | 3/2012 | Olakangil | H04L 43/026 370/253 |
| 2012/0224486 A1 | 9/2012 | Battestilli | |
| 2012/0294317 A1 | 11/2012 | Livine | |
| 2012/0303830 A1 | 11/2012 | Tobioka | |
| 2013/0201831 A1 | 8/2013 | Tal | |
| 2013/0246698 A1 | 9/2013 | Estan | |
| 2014/0032974 A1 | 1/2014 | Peck | |
| 2014/0112147 A1 | 4/2014 | Esposito | |
| 2014/0143300 A1 | 5/2014 | Karlsson | |
| 2014/0201470 A1 | 7/2014 | Joshua | |
| 2014/0269252 A1 | 9/2014 | Anumala | |
| 2014/0321467 A1 | 10/2014 | Wang | |
| 2015/0124614 A1 | 5/2015 | Alizadeh | |
| 2015/0312156 A1 | 10/2015 | Kitada | |
| 2016/0088020 A1 | 3/2016 | Chan | |
| 2016/0173104 A1 | 6/2016 | Vassiliev | |

OTHER PUBLICATIONS

The office action dated Nov. 25, 2019, for Chinese Application No. 201510253417.3.
The Korean Office Action dated Apr. 6, 2021 for Korean Patent Application No. 10-2015-0073195.
The Korean Office Action dated Oct. 22, 2021 for Korean Patent Application No. 10-2015-0073195.
The Korean Office Action dated Apr. 20, 2022 for Korean Patent Application No. 10-2015-0073195.

* cited by examiner

METHOD AND APPARATUS FOR FLEXIBLE AND EFFICIENT ANALYTICS IN A NETWORK SWITCH

RELATED APPLICATIONS

This application is a divisional of U.S. application Ser. No. 14/289,533, filed on May 28, 2014, and entitled "METHOD AND APPARATUS FOR FLEXIBLE AND EFFICIENT ANALYTICS IN A NETWORK SWITCH," which is hereby incorporated by reference.

FIELD OF INVENTION

The present invention relates to traffic analytics in a high speed network switch. More particularly, the present invention relates to method and apparatus for flexible and efficient analytics in a network switch, wherein the analytics include counting, rate monitoring and flow sampling.

BACKGROUND OF THE INVENTION

Software defined networks (SDN) has emerged, and open flow is one of the prominent representatives. Incoming packets go through series of table searches and match actions, and analytics. Good abstraction in network switches are of paramount importance as it allows for efficient usage of limited hardware resource, dealing with changing requirements, as well as simplicity of programming in the next higher level.

Counters, two-rate three-color rate monitors (policing) and flow sampling exists in prior art network switches. The prior art network switches use dedicated memory for each of these purposes. Particularly, these counters, rate monitors and samplers are accessible from certain fixed stages of an internal pipeline since each processing unit of the internal pipeline is predefined to perform designated tasks. Counters are used to count number of packets, or bytes of traffic in various conditions through the switch. Policing classifies packet through the switch into three different colors, namely, green, yellow or red, each of which may be associated with a different quality of service. Sampling samples a high speed flow of traffic into a lower speed stream and send to system CPU for additional processing or analyzing. Accordingly, the prior art network switches lack the flexibility to perform counting, traffic rate monitoring and flow sampling.

BRIEF SUMMARY OF THE INVENTION

Embodiments of the present invention relate to a centralized network analytic device, the centralized network analytic device efficiently uses on-chip memory to flexibly perform counting, traffic rate monitoring and flow sampling. The device includes a pool of memory that is shared by all cores and packet processing stages of each core. The counting, the monitoring and the sampling are all defined through software allowing for greater flexibility and efficient analytics in the device. In some embodiments, the device is a network switch.

In one aspect, a network switch is provided. The network switch includes at least one core that includes a plurality of pipeline stages. The network switch also includes an interface module including a unified request and response interface for communicating with each of the plurality of pipeline stages of the at least one core to receive requests therefrom. The network switch also includes a common memory pool coupled with the interface module and for processing the requests in parallel.

In some embodiments, the network switch also includes an analytics module for performing multiple parallel network analytics. The analytics module includes a plurality of client interfaces, an interconnect and a plurality of analytics banks. The plurality of client interface and the plurality of analytics banks are interconnected through the interconnect.

In some embodiments, each of the plurality of client interfaces is programmable to map to one or more of the plurality of analytics banks.

In some embodiments, memories from the common memory pool are separated into the plurality of analytics banks.

In some embodiments, the plurality of analytics banks is homogenous.

In some embodiments, each of the plurality of analytics banks includes an on-chip memory, such as a 272-bit wide and 512-entry deep on-chip memory.

In some embodiments, the plurality of client interfaces is similarly configured.

In some embodiments, each of the plurality of client interfaces includes a request interface for receiving requests and a response interface for sending responses. The request interface classifies each request and determines a target analytics bank and a target entry address within the target analytics bank that the request should target. The target analytics bank is one of the plurality of analytics bank. The request is sent to the interconnect to be routed to the target analytics bank for processing.

In some embodiments, each of the plurality of client interfaces is configured as one of four modes: counter, policing, policing with billing counters and sampling.

In some embodiments, the counting mode, the policing mode and the sampling mode are each allocated at bank granularity, and wherein the policing with billing counters mode is allocated at granularity of a pair of analytics banks. For example, analytics bank 2*i is for policing and the immediate next analytics bank 2*i+1 is for corresponding billing counters.

In some embodiments, when an analytics bank is in counting mode, the analytics bank is configured in one of four configurations, wherein modification operations are different for each of the configurations. The modification operations include incrementing the value of an events field by one for each incoming request, incrementing the value of a sum field by the value of the incoming request, and incrementing the value of a sumOfSquare field by the square of the value of the incoming request. Standard deviation of network activities is calculated by subtracting the square of average of sum from the average of sumOfSquare. No result response goes out of the analytics bank, wherein counter values are stored in memory of the analytics bank. In some embodiments, a fifth configuration is only used for policing with billing counter mode.

In some embodiments, when an analytics bank is in policing mode, the analytics bank performs a two-rate three color rate monitoring function. Every row of the analytics bank has one policer, wherein the policer has configuration and internal state. The policer returns a color of a packet to one of the client interfaces that originated the packet. In some embodiments, when the originating client interface is configured as policing with billing counters mode, the analytics bank is sends a counter request to its immediate next analytics bank to calculate byte count for a packet in each color.

In some embodiments, when an analytics bank is in sampling mode, the analytics bank supports N/M random sampling, wherein N contiguous events are sampled in every M events interval. A response is returned to the originating client interface for each request.

In another aspect, an analytics bank is provided. The analytics bank includes at least three processing units and a memory bypass module.

The at least three processing units includes a counter processing unit, a policing processing unit and a sampling processing unit. The policing processing unit is able to push a request to another analytics bank for byte counting of color, wherein the another analytics bank is immediate next to the analytics bank The memory bypass module hides memory read latency. In particular, output data of the memory bypass module is directed to the counter processing unit, the policing processing unit or the sampling processing unit.

In some embodiments, when the analytics bank is in counter mode, the counter processing unit is configured to calculate sum of square, summation and event count for network activity statistical analysis. In some embodiments, the counter processing unit is configured to calculate standard deviation of network activities.

In yet another aspect, a method of a network switch is provided. The method includes partitioning a pool of shared memories into a plurality of homogeneous analytics banks, and programmably configuring each of a plurality of client interfaces as one of four modes: counter, policing, policing with billing counters or sampling. The method also includes programmably mapping each of the plurality of client interfaces to a subset of the plurality of homogeneous analytics banks, and programmably assigning each of the plurality of homogeneous analytics banks as one of three modes: counter, policing or sampling. The method also includes parallel processing multiple requests received at the plurality of client interfaces.

In some embodiments, the parallel processing multiple requests step includes, for each of the multiple requests, determining a target analytics bank and a target entry address within the target analytics bank.

The parallel processing multiple requests step also includes, when the target analytics bank is in the counter mode, the target analytics bank performing at least one operation, such as sum of square, summation or event count. The standard deviation of network activities can also be calculated. A counter entry within the target analytics bank based on the target entry address is determined and a memory row within the target analytics bank is also determined to store counter values.

The parallel processing multiple requests step also includes, when the target analytics bank is in the policing mode, the target analytics bank performing a two-rate three-color rate monitoring function. The target analytics bank returns a color of a packet to an originating client interface of the packet. If configured as policing with billing counters, then the target analytics bank sends a counter request to an immediate next analytics bank for calculating byte count for the packet in each color.

The parallel processing multiple requests step can also include, when the target analytics bank is in the sampling mode, the target analytics bank supporting N/M random sampling, wherein N contiguous events are sampled in every M events interval. The target analytics bank returns a response to an originating client interface of the request.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention relate to a centralized network analytic device, the centralized network analytic device efficiently uses on-chip memory to flexibly perform counting, traffic rate monitoring and flow sampling. The device includes a pool of memory that is shared by all cores and packet processing stages of each core. The counting, the monitoring and the sampling are all defined through software allowing for greater flexibility and efficient analytics in the device. In some embodiments, the device is a network switch. Other networking devices are contemplated.

Figure 1:
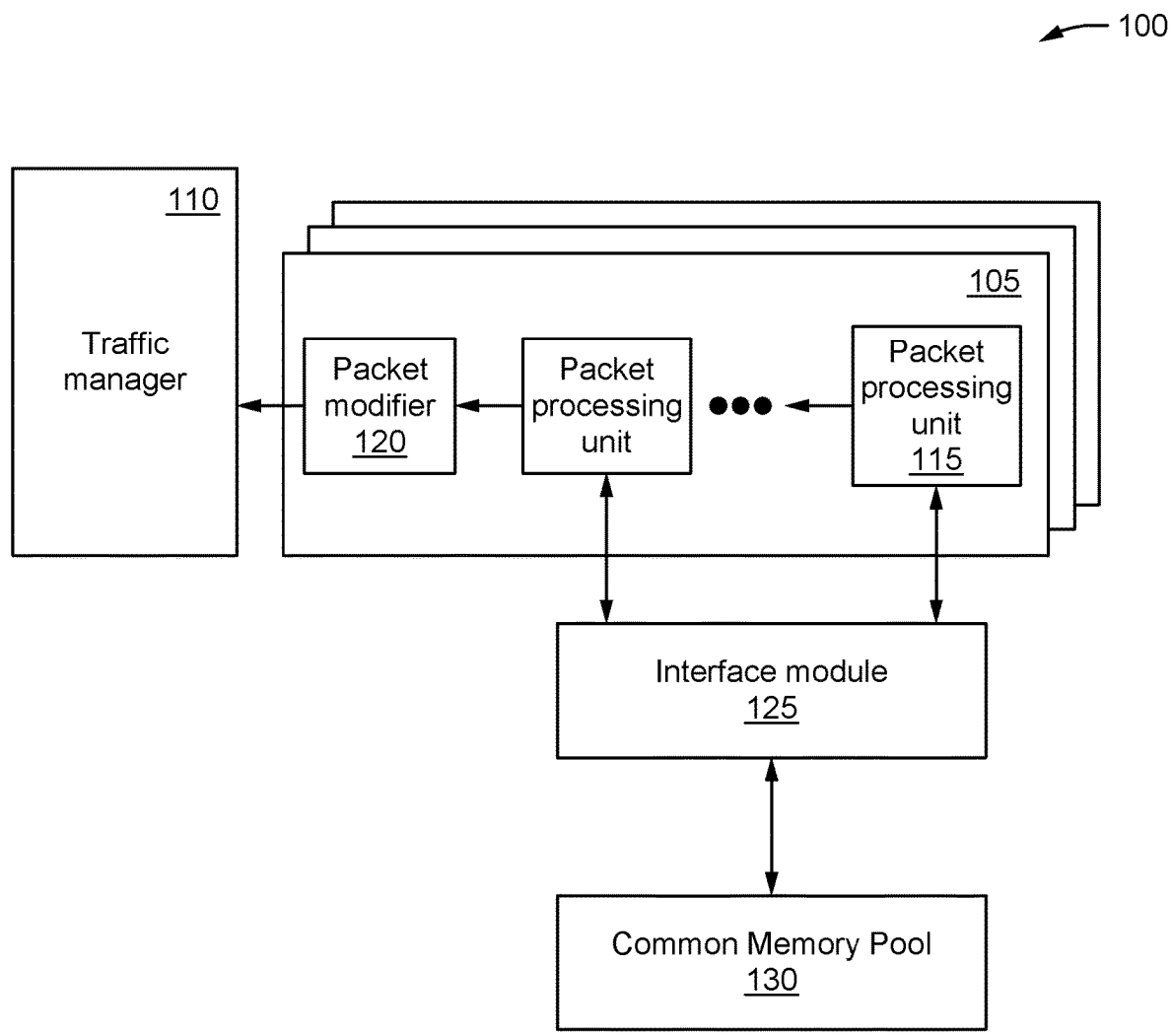
FIG. 1 illustrates an exemplary aspect of a network switch according to an embodiment of the present invention.

FIG. 1 illustrates an exemplary aspect of a network switch 100 according to an embodiment of the present invention. The network switch 100 includes one or more cores 105 and a traffic manager 110. Each core 105 typically includes a plurality of pipeline stages. The plurality of pipeline stages includes a plurality of packet processing units 115 and at least one packet modifier 120. All processing units 115, 120 in the one or more cores 105 communicate with an interface module 125 through a unified request and response interface (see FIG. 2). The interface module 125 is coupled with a common memory pool 130 for request processing.

Figure 2:
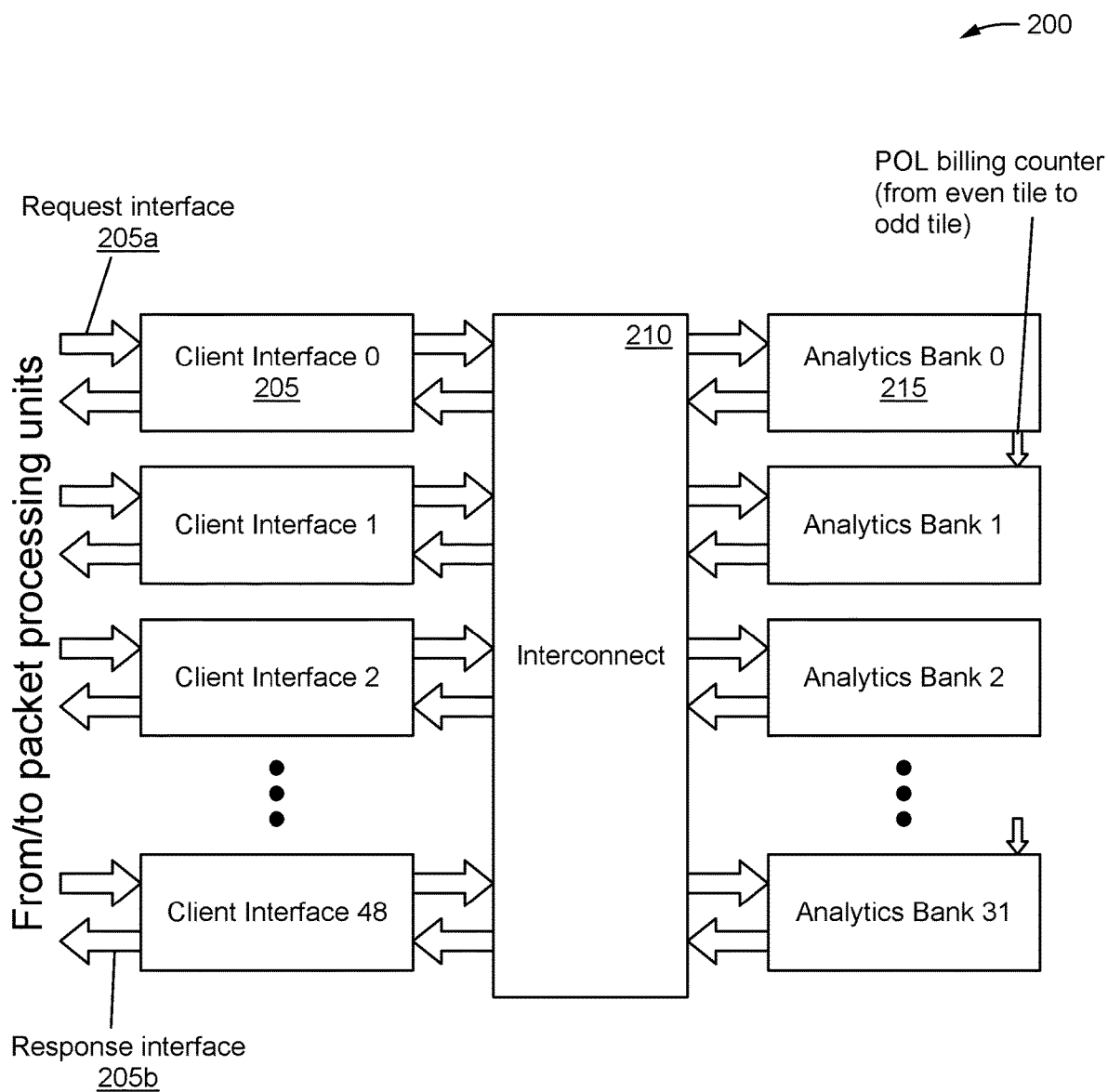
FIG. 2 illustrates an analytics module according to an embodiment of the present invention.

FIG. 2 illustrates an analytics module 200 according to an embodiment of the present invention. The analytics module 200 is typically a part of a network switch, such as the network switch 100 of FIG. 1. The analytics module 200 includes a plurality of client interfaces 205, an interconnect 210 and a plurality of analytics banks 215. The plurality of client interfaces 205 and the plurality of analytics banks 215 are interconnected through the on-chip network 210. Each client interface 205 is programmable to map to one or more of the plurality of analytics banks 215. The memories from the common memory pool 130 of FIG. 1 are typically separated into the plurality of analytics banks 215. In some embodiments, the plurality of analytics banks 215 is homogenous in that each analytics bank 215 contains the same number of memories as the other analytics banks 215. In some embodiments, each analytics bank 215 includes a 272-bit wide and 512-entry deep on-chip memory, although other memory sizes are possible.

In some embodiments, the client interfaces 205 are similarly configured. Each client interface 205 typically has a request interface 205a and a response interface 205b. The request interfaces 205a of the client interfaces 205 are configured to receive incoming requests, which each includes a request address and a request value, from packet processing units and the response interfaces 205b of the client interfaces 205 are configured to send responses to the packet processing units. In some embodiments, the packet processing units correspond with the cores 105 of FIG. 1. Each request interface 205a typically classifies each incoming request and determines a target analytics bank and a target entry address within in the target analytics bank that the request should target. The target analytics bank is typically one of the one or more of the plurality of analytics banks 215 that the client interface 205 is mapped to. The request is then sent to the on-chip network 210 to be routed to the target analytics bank 215 for processing. Each request typically has no more than one response (e.g., either no responses or exactly one response).

Table 1 illustrates a table configuration for each client interface 205. Each client interface 205 can be configured as one of four possible modes (i.e., counting, policing, policing with billing counters, and sampling), as indicated by the mode field.

TABLE 1

| Config. Name | Size | Description |
| --- | --- | --- |
| mode | 4 | Counter, policing, policing with billing counters or sampling mode |
| anaBankStart | 6 | Starting analytics bank for the table |
| anaBankEnd | 6 | End analytics bank for the table |
| entryPerBank | 3 | In unit of 512-entry. Used for address decoding of multi-bank tables. Each analytics bank can be configured to host different amount of table entries. |

As discussed above, while the sizes the analytics banks 215 are the same, the connection between the client interfaces 205 and the analytics banks 215 is programmable through software. In particular, the mapping of each client interface 205 to a subset of the analytics banks 215 can be defined through software. In one extreme, a client interface 205 can use one analytics bank 215. In an opposite extreme, a client interface 205 can use all of the analytics banks 215. It is possible for two or more client interfaces 205 to use the same subset of analytics banks 215.

Each client interface 205 is able to utilize one or more analytics banks 215, as specified by the anaBankStart and anaBankEnd fields, wherein the analytics banks 215 therebetween are typically contiguous. The entryPerBank field indicates a number of entries that reside in each analytics bank 215. The entryPerBank field is used to calculate the target analytics bank 215 for each request. In some embodiments, an integer part of an incoming request address divided by the number of entries per analytics bank 215 (i.e., entryPerBank) becomes the target analytics bank ID, and the least significant bits of the incoming request address are used to generate a target entry address within that analytics bank 215.

In some embodiments, one or more pairs of the analytics banks 215 is connected for policing mode with billing counters. In other words, while the counter mode, the policing mode and the sampling mode are each allocated at bank granularity, policing with billing counters is allocated at granularity of pair of analytics banks 215 such that analytics bank $2 \ast i$ is for policing and the immediate next analytics bank $2 \ast i+1$ is for corresponding billing counters.

Counting

Table 2 lists supported counting configurations of an analytics bank 215 in the counter mode. In the counter mode, an analytics bank 215 can be configured in one of four different configurations: A, B, C and D.

TABLE 2

| Mode | Logical Entry Width | Fields | Modification Operation |
| --- | --- | --- | --- |
| A | 136 bits | 54-b sumOfSquare | sumOfSquare += value$^2$ |
| | | 46-b sum | sum += value |
| | | 36-b events | events += 1 |
| B | 68 bits | 38-b sum | sum += value |
| | | 30-b events | events += 1 |
| C | 34 bits | 34-b events | events += 1 |
| D | 17 bits | 17-b events | events += 1 |
| P | 246 bits | 46-b red_sum | |
| | | 36-b red_events | |
| | | 46-b yellow_sum | |
| | | 36-b yellow_events | |
| | | 46-b green_sum | |
| | | 36-b green_events | |

Modification operations are different for each of the counter mode configurations. In counter mode configuration A, a counter entry contains three fields: sumOfSquare, sum and events. The value of the events field is incremented by one for each incoming request. The value of the sum field is incremented by the value of the incoming request. The value of the sumOfSquare field is incremented by the square of the value of incoming request. As such, a higher level application could use this counter mode configuration A to derive the standard deviation by subtracting the square of average of sum (i.e., sum/events) from the average of sumOfSquare (sumOfSquare/events). The standard deviation enables additional statistics analysis of the network switch. Counter mode configurations B, C, D and P are similarly organized as the counter mode configuration A. In some embodiments, the counter mode configuration P is only used for policing with billing counters mode and is thus not visible to the client interfaces 205 of FIG. 2. Policing with billing counters are discussed below.

As shown in Table 2, each counter entry is less than the memory width. The least significant bits of the target entry address are used to select the counter entry within a memory, while the most significant bits are used to select the memory row within the analytics bank There is typically no result response for the counter mode. In other words, no response goes out from the analytics bank. Rather, counter values are stored in memory of the analytics bank for system CPU to read.

Based on configuration of the analytics banks, each of the fields will either stick at their maximum value or wrap around.

Policing

Each of the analytics banks 215 of FIG. 2 can be configured as a two-rate three-color marking policing analytics bank to perform a standard two-rate three-color rate monitoring function. Every row of the policing analytics bank has one policer or rate monitor. The terms policer and rate monitor are used interchangeably herein. The policer classifies each packet as one of three colors: red, yellow and green. A packet is marked red if it exceeds a peak rate.

Otherwise, the packet is marked either yellow or green depending on whether the packet exceeds or does not exceed a committed rate.

Each policer has its own configuration and an internal state. Typically, the internal state is in the upper half of the policer, while the configuration is in the lower half of the policer. The configuration typically includes the two rates, and the state typically includes what the current rate is. The policer returns the color of a packet to the originating client interface.

Figure 3:
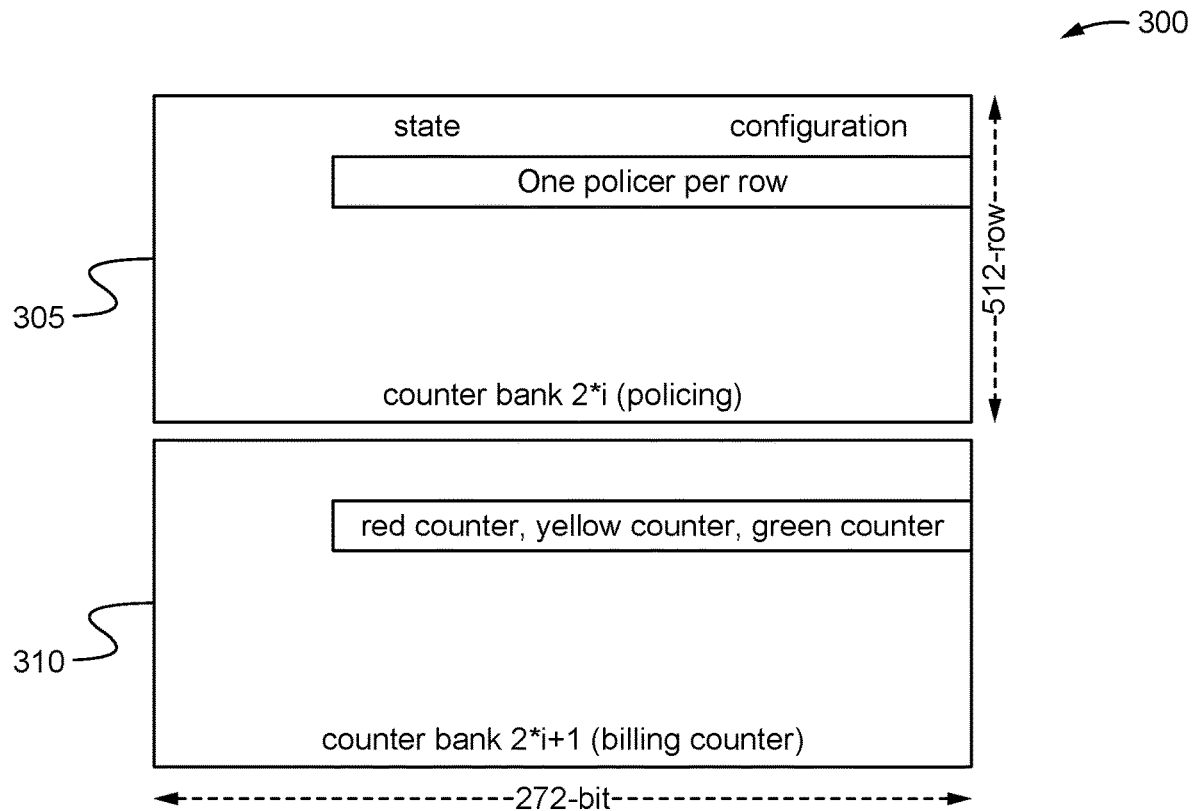
FIG. 3 illustrates a policing analytics bank memory organization for policing with billing counters mode according to an embodiment of the present invention.

Policing with billing counters includes an even number of analytics banks, wherein analytics bank 2*i is for policing and analytics bank 2*i+1 is for the associated billing counters. FIG. 3 illustrates a policing analytics bank memory organization 300 for policing with billing counters mode according to an embodiment of the present invention. As shown in FIG. 3, when the originating client interface is configured as policing with billing counters mode, analytics bank 305 configured in policing mode sends a counter request to its immediate next analytics bank 310 configured in counter mode configuration P. As such, byte count for packet in each color is calculated at the analytics bank 310.

Sampling

Table 3 lists supported sampling configurations of an analytics bank 215 in the sampler mode. Each analytics bank 215 is configured to support N/M random sampling, where N contiguous events are sampled in every M events interval. Within each interval, the sampled events start from a random offset. In this mode, each sampler has an associated configuration, as shown in Table 3. M is calculated as M base*$2^{M\_expo}$.

TABLE 3

| Field | Width | Description |
|---|---|---|
| N | 8 | M = M_base * $2^{M-expo}$, M ceiled at 255*$2^{12}$ |
| M_base | 8 | |
| M_expo | 4 | |
| Subtotal | 20 | |

Table 4 illustrates sampler states for each individual sampler in the analytics bank

TABLE 4

| Field | Width | Description |
|---|---|---|
| total_cnt | 64 | Total events that could have been sampled |
| interval_event_cnt | 20 | Warps around at M, regardless of clearOnRead and/or wraparound configuration |
| interval_smp_start | 20 | Which event to start sampling, updated every N event |
| Subtotal | 104 | |

As shown in Table 4, the total_cnt field records total number of events that has been sampled. The total_cnt field is read and cleared from the CPU such that the system can obtain important statistics about the sampler. It also keeps intermediate state to count the start and end of the current sampling interval, as interval_event_cnt, at the beginning of each interval, a random sampling start point is decided, so events interval_smp_start through interval_smp_start+N−1 are sampled. A sample or non-sample response is returned to the originating client interface for each request.

Figure 4:
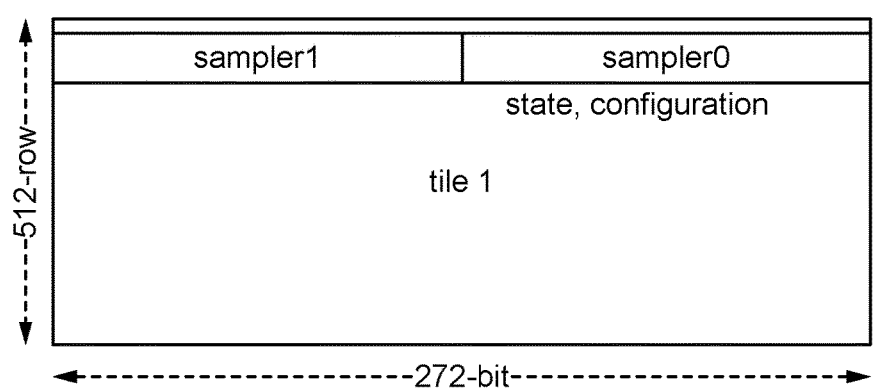
FIG. 4 illustrates a sampling analytics bank memory organization according to an embodiment of the present invention.

FIG. 4 illustrates a sampling analytics bank memory organization 400 according to an embodiment of the present invention. As shown in FIG. 4, two sample entries reside in on memory row, with the least significant bit of target entry address being used to select one of these two entries while all other bits are used to select the target memory row.

Analytics Bank

Figure 5:
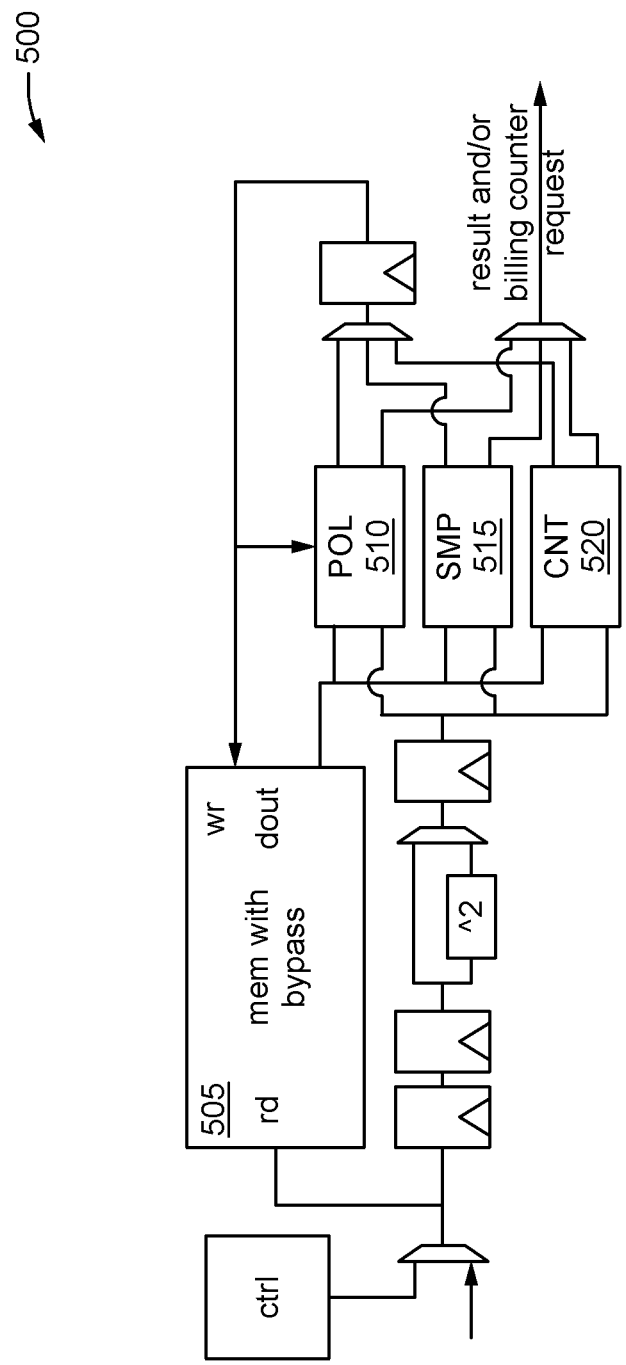
FIG. 5 illustrates a block diagram of an analytics bank according to an embodiment of the present invention.

FIG. 5 illustrates a block diagram of an analytics bank 500 according to an embodiment of the present invention. The analytics bank 500 is similarly configured as the analytics bank 215. All operations for counter, policing and sampling can be classified as memory read-modify-write. Since there can be a read latency for memories, which can create a hazard, a memory bypass module 505 is used to hide the memory read latency. Output data of the memory bypass module 505 is directed to one of three processing units, namely a counter processing unit 520, a policing processing unit 510 or a sampling processing unit 515. As discussed above, the policing processing unit 510 is able to push request to its immediate next analytics bank (not illustrated) for byte counting of each color.

Figure 6:
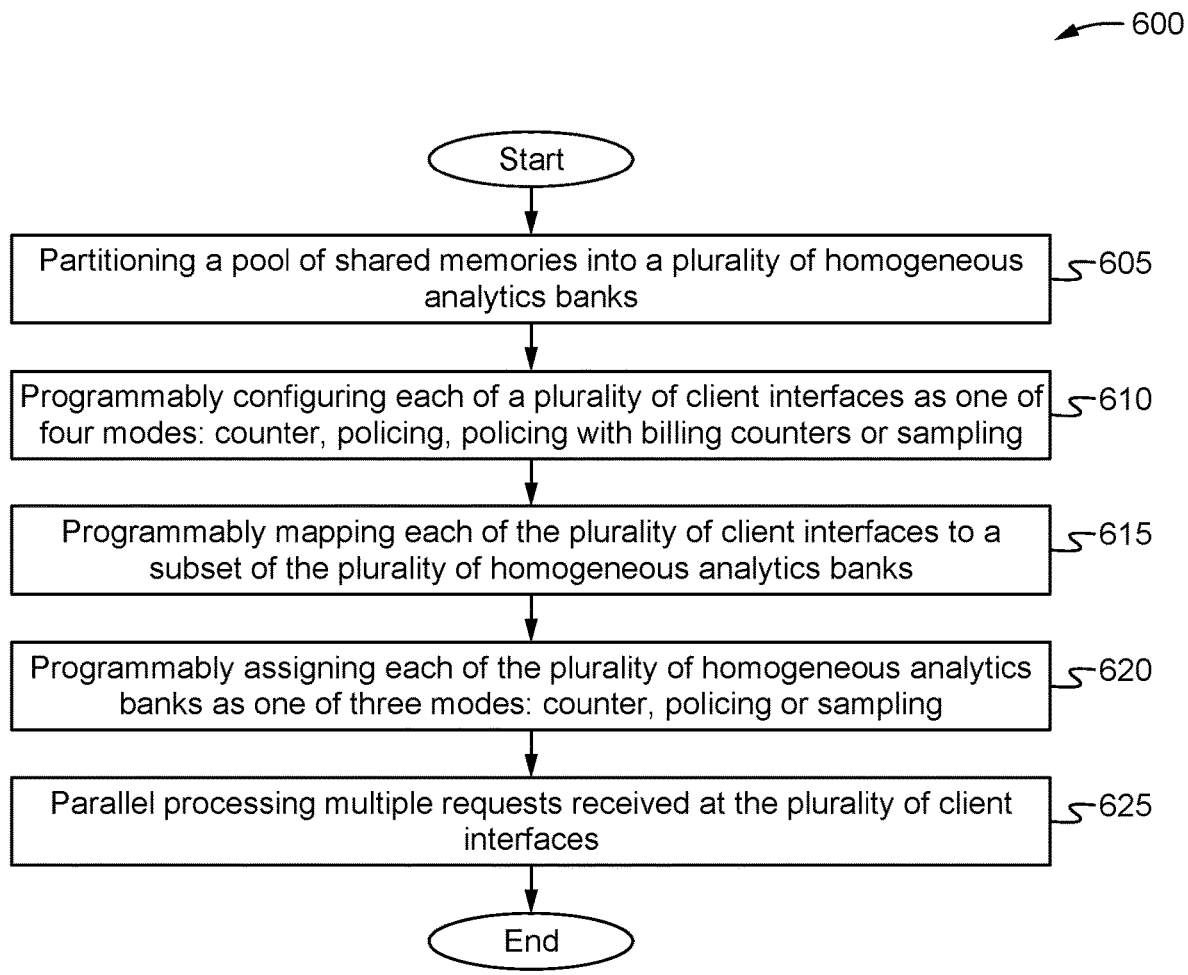
FIG. 6 illustrates a method of a network switch according to an embodiment of the present invention.

FIG. 6 illustrates a method 600 of a network switch, such as the network switch 100 of FIG. 1, according to an embodiment of the present invention. As discussed above, the network switch 100 includes an interface module and a pool of shared memories. The interface module typically includes a plurality of client interfaces. Each of the client interfaces includes a request interface for receiving requests and a response interface for sending responses.

At a step 605, where the pool of shared memories are partitioned into a plurality of homogeneous analytics banks. In some embodiments, each of the homogeneous analytics banks includes a 272-bit wide and 512-entry deep on-chip memory.

At a step 610, each of a plurality of client interfaces is programmably configured as one of four modes: counter, policing, policing with billing counters or sampling.

At a step 615, each of the plurality of client interfaces is programmably mapped to a subset of the plurality of homogeneous analytics banks. In one extreme, a client interface is mapped to a single analytics bank. In an opposite extreme, a client interface is mapped to all of the analytics banks.

At a step 620, each of the plurality of homogeneous analytics banks is programmably assigned as one of three modes: counter, policing or sampling.

At a step 625, multiple requests received at the plurality of client interfaces are processed in parallel. For each of the multiple requests, a target analytics bank is determined, as well as a target entry address within the target analytics bank.

When the target analytics bank is in the counter mode, the target analytics bank performs at least one operation, such as sum of square, summation or event count. Standard deviation of network activities can also be calculated. A counter entry within the target analytics bank is determined based on the target entry address. A memory row within the target analytics bank is also determined to store counter values.

When the target analytics bank is in the policing mode, the target analytics bank performs a two-rate three-color rate monitoring function. The target analytics bank returns a color of a packet to an originating client interface of the packet. When the originating client interface is configured as policing with billing counters, the target analytics bank sends a counter request to an immediate next analytics bank for calculating byte count for the packet in each color.

When the target analytics bank is in the sampling mode, the target analytics bank supports N/M random sampling, wherein N contiguous events are sampled in every M events.

The target analytics bank returns a response to an originating client interface of the request.

The network switch of the present invention differs from those in prior art, where a counter module, policing module, sampling module or all are fixated with a particular processing unit. In contrast to the prior art, counting, monitoring and sampling are all defined or programmed through software allowing for greater flexibility and efficient analytics in the network switch of the present invention.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. An analytics bank comprising:
   at least three processing units including:
      a counter processing unit;
      a policing processing unit, wherein the policing processing unit is able to label one or more data packets of a request as a color selected from a first color, a second color and a third color and push the request to an adjacent analytics bank for calculating byte counts of the packets for each of the first color, the second color and the third color; and
      a sampling processing unit; and
   a memory bypass module to hide memory read latency, wherein output data of the memory bypass module is directed to the counter processing unit, the policing processing unit or the sampling processing unit.

2. The analytics bank of claim 1, wherein when the analytics bank is in counter mode, the counter processing unit is configured to calculate sum of square, summation and event count for network activity statistical analysis.

3. The analytics bank of claim 2, wherein the counter processing unit is configured to calculate standard deviation of network activities.

4. The analytics bank of claim 2, wherein calculating the sum of square includes incrementing the value of an events field by one for each incoming request, calculating the summation includes incrementing the value of a sum field by the value of the incoming request, and calculating the event count includes incrementing the value of a sumOfSquare field by the square of the value of the incoming request.

5. The analytics bank of claim 3, wherein the counter processing unit calculates the standard deviation of network activities by subtracting the square of average of sum from the average of sumOfSquare.

6. The analytics bank of claim 1, wherein the analytics bank and the adjacent analytics bank are interconnected through the interconnect.

7. The analytics bank of claim 1, wherein the analytics bank and the adjacent analytics bank are homogenous.

8. The analytics bank of claim 1, further comprising a bank memory, wherein when no result response goes out of the analytics bank and counter values are stored in the bank memory.

9. The analytics bank of claim 1, wherein when the analytics bank is in policing mode, the policing processing unit performs a two-rate three color rate monitoring function.

10. The analytics bank of claim 1, wherein every row of the analytics bank has one policer of the policing processing unit, wherein the policer has configuration and internal state.

11. The analytics bank of claim 1, wherein the policing processing unit returns a color of a packet to one of a plurality of client interfaces that originated the packet.

12. The analytics bank of claim 1, wherein when the analytics bank is configured in policing mode and the adjacent analytics bank is configured in counting mode, the policing processing unit sends a counter request to the adjacent analytics bank to calculate byte count for a packet in each color.

13. The analytics bank of claim 1, wherein when the analytics bank is in sampling mode, the sampling processing unit supports N/M random sampling, wherein N contiguous events are sampled in every M events interval.

14. The analytics bank of claim 1, wherein the at least three processing units return a response to an originating client interface for each request.

15. An analytics bank pair comprising:
    a first analytics bank; and
    a second analytics bank immediately adjacent to the first analytics bank within a common memory pool, each of the first analytics bank and the second analytics bank comprising a counter processing unit, a policing processing unit and a sampling processing unit, wherein when the first analytics bank is configured in policing mode and the second analytics bank is configured in counting mode, the policing processing unit of the first analytics bank labels one or more data packets of a request as a color selected from a first color, a second color and a third color and sends at least one counter request including the data packets to the counter processing unit of the second analytics bank to calculate byte counts of the packets for each of the first color, the second color and the third color.

16. The analytics bank pair of claim 15, wherein when the second analytics bank is in counter mode, the counter processing unit is configured to calculate sum of square, summation and event count for network activity statistical analysis.

17. The analytics bank pair of claim 16, wherein the counter processing unit of the second analytics bank is configured to calculate standard deviation of network activities.

18. The analytics bank pair of claim 16, wherein calculating the sum of square includes incrementing the value of an events field by one for each incoming request, calculating the summation includes incrementing the value of a sum field by the value of the incoming request, and calculating the event count includes incrementing the value of a sumOfSquare field by the square of the value of the incoming request.

19. The analytics bank pair of claim 17, wherein the counter processing unit of the second analytics bank calculates the standard deviation of network activities by subtracting the square of average of sum from the average of sumOfSquare.

20. The analytics bank pair of claim 15, wherein the first analytics bank and the second analytics bank are interconnected through the interconnect.

21. The analytics bank pair of claim 15, wherein the first analytics bank and the second analytics bank are homogenous.

22. The analytics bank pair of claim 15, wherein each of the first analytics bank and the second analytics bank further comprise a bank memory and when no result response goes out of the first analytics bank and counter values are stored in the bank memory of the first analytics bank.

23. The analytics bank pair of claim 15, wherein when the first analytics bank is in policing mode, the policing processing unit of the first analytics bank performs a two-rate three color rate monitoring function.

24. The analytics bank pair of claim 15, wherein every row of the first analytics bank has one policer of the policing processing unit of the first analytics bank, wherein the policer has configuration and internal state.

25. The analytics bank pair of claim 15, wherein the policing processing unit of the first analytics bank returns a color of a packet to one of a plurality of client interfaces that originated the packet.

26. The analytics bank pair of claim 15, wherein when the first analytics bank is in sampling mode, the sampling processing unit of the first analytics bank supports N/M random sampling, wherein N contiguous events are sampled in every M events interval.

27. The analytics bank pair of claim 15, wherein the at least three processing units return a response to an originating client interface for each request.

28. An analytics bank comprising:
- at least two processing units selected from the group consisting of a counter processing unit, a policing processing unit and a sampling processing unit; and
- a memory bypass module to hide memory read latency, wherein output data of the memory bypass module is directed to the counter processing unit, the policing processing unit or the sampling processing unit, wherein the analytics bank is able to be switched from one of counting with the counter processing unit, policing with the policing processing unit and sampling with the sampling processing unit to another of the counting with the counter processing unit, the policing with the policing processing unit and the sampling with the sampling processing unit by switching where the output data of the memory bypass module is directed.

* * * * *